No. 620,227. Patented Feb. 28, 1899.
H. F. CONDON.
PIPE BENDING APPARATUS.
(Application filed Apr. 25, 1898.)
(No Model.)
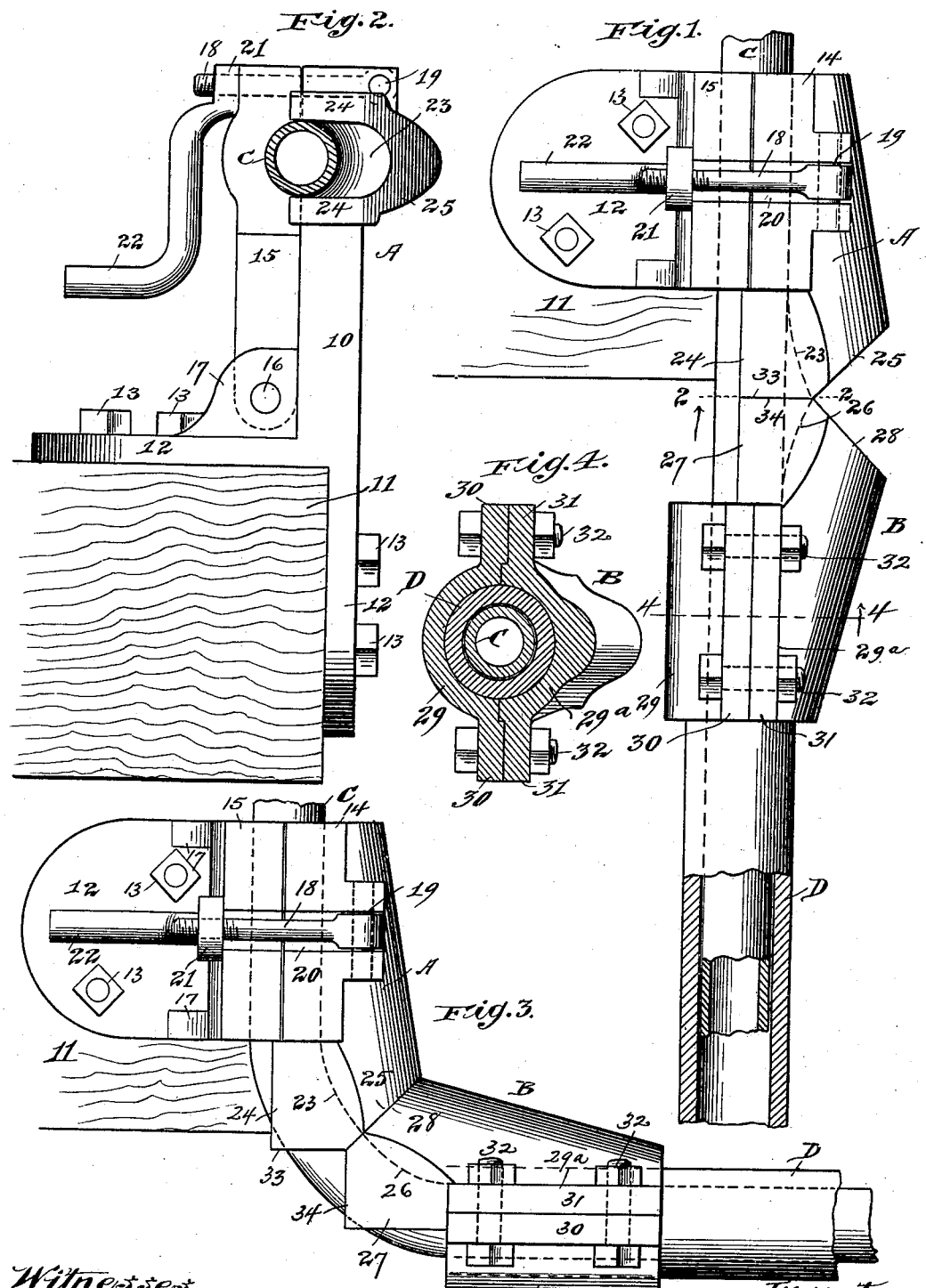

UNITED STATES PATENT OFFICE.

HENRY F. CONDON, OF DE KALB, ILLINOIS, ASSIGNOR TO JOSEPH F. GLIDDEN, OF SAME PLACE.

PIPE-BENDING APPARATUS.

SPECIFICATION forming part of Letters Patent No. 620,227, dated February 28, 1899.

Application filed April 25, 1898. Serial No. 678,731. (No model.)

*To all whom it may concern:*

Be it known that I, HENRY F. CONDON, of De Kalb, in the county of De Kalb and State of Illinois, have invented certain new and useful Improvements in Pipe-Bending Apparatus, of which the following is a specification.

This invention relates to pipe-bending apparatus, and has for its object to produce an inexpensive, simple, and efficient device whereby pipes, tubes, or other similar hollow bodies may be readily bent at any desired angle with great rapidity and without crushing or flattening the pipe at the bend.

To these ends the invention consists in certain novel features, which I will now proceed to describe and will then particularly point out in the claims.

In the accompanying drawings, Figure 1 represents a plan view of an apparatus embodying my invention, a portion thereof being in section, the parts being shown in position ready for bending the pipe. Fig. 2 is a sectional elevation of the same, taken on the line 2 2 of Fig. 1 and looking in the direction of the arrow. Fig. 3 is a plan view showing the parts in the position they assume after the bending of the pipe is completed, and Fig. 4 is a detail sectional view taken on the line 4 4 of Fig. 1.

In its general structure my improved apparatus consists of two separate and normally-disconnected members, one of which is adapted to clamp the pipe to be bent, while the other is free to slide thereon, each of said members having a curved surface which determines the curvature of the pipe, projecting flanges which prevent an increase in the diameter of the pipe in a direction transverse to the plane in which it is bent, and an angular face which, in conjunction with the similar face on the other member, determines the angle or extent to which the pipe is bent. In the present instance I have shown an apparatus adapted to bend a pipe at a right angle, although it is obvious that said angle may be varied in the manner hereinafter set forth.

A indicates the stationary member, which in the present instance is also the clamping member and which consists of a standard 10, by means of which said member may be secured to a table 11 or other suitable base, the standard being provided with flanges 12 and bolts 13 or other suitable provisions for the purpose of attaching it to said table or base.

The member A comprises a fixed jaw 14 and a movable jaw 15, between which the pipe C to be bent may be clamped. These jaws are grooved on their inner faces to adapt them to fit upon the pipe. The movable jaw 15 is preferably a hinged jaw, it being shown as pivoted at its lower end upon a suitable pivot pin or bolt 16 between the lugs 17 at the base of the standard. The jaws are drawn together to clamp the pipe by means of a screw 18, which is pivoted at 19 to the fixed jaw and which lies in a slot 20, extending transversely across the top of both jaws. A nut 21, fitting on the screw 18, bears against the outer face of the movable jaw 15 and is provided with a crank-handle 22, by means of which power may be applied to rotate said nut and clamp the pipe between the jaws. Beyond the clamping-jaws the body of the member A is curved in a horizontal plane, as indicated at 23, said curve conforming to the curvature to be imparted to the pipe to be bent, and the body of the member is provided above and below said curved portion with horizontally-extending flanges 24, which are arranged in a plane parallel to the plane in which the pipe is to be bent and above and below the same, respectively. The body of the member A terminates beyond the curved portion 23 in a plane face 25, located at an angle to the parallel faces of the clamping-jaws of the member, and consequently at an angle to the line of the pipe before it is bent. This angle, which may be varied according to the extent of the angle to which it is desired to bend the pipe, is in the present instance one-half of a right angle, or forty-five degrees, the apparatus shown being, as hereinbefore stated, adapted to bend the pipe at a right angle.

B indicates the sliding member of the bending apparatus, which is provided at its end adjacent to the member A with a curved portion 26, corresponding to the curved portion 23, horizontal flanges 27, corresponding with the flanges 24, and with a plane face 28, arranged at an angle and corresponding to the face 25 of the member A. This member B is adapted to be mounted and slide on the pipe to be bent. For this purpose said member has an apertured body, as shown in section in Fig. 4, made in two parts 29 and 29ª, provided with flanges 30 and 31, connected by bolts 32.

D indicates a lever by means of which power may be applied to the member B for the purpose of bending the pipe. This lever is hollow in order to admit into its interior the end of the pipe to be bent which extends beyond the bending apparatus, and the end of said lever adjacent to the member B extends into the aperture of the same and is clamped therein between the two parts of the body of said member. It may, however, be otherwise joined thereto. In the drawings only a portion of this lever is shown, it being understood that it will be of sufficient length to give the necessary leverage to effect the bending of the pipe with facility.

The members A and B are provided at their adjacent ends with terminal surfaces 33 and 34 at right angles to the longitudinal axes of their body portions, the meeting surfaces thus formed serving as a stop to determine the position of the member B when it is placed upon the pipe C to be bent to cause it to be brought into proper relative position to the member A before the bending operation begins.

The operation of the apparatus is as follows: The pipe to be bent is clamped between the jaws 14 ank 15 of the fixed member A in an obvious manner at a portion of its body immediately adjacent to the point where the bend is to be made. The movable member B is thereupon placed over the projecting end of the pipe and slid into place thereon until it comes into contact with the member A, the projecting end of the pipe passing through the member B and into the hollow interior of the lever D. Power is then applied to the extremity of the lever D either by hand or otherwise, whereupon the pipe will be bent to conform to the curvature of the surfaces 23 and 26 of the members A and B, against which it is forced by the turning of the two members into a position angular to each other. During this bending operation the member B slides upon the pipe, while the flanges 24 and 27 of the two members projecting over the body of the pipe prevent the same from increasing in vertical diameter, and consequently from flattening during the operation of bending. The angular faces 25 and 28 of the members determine the extent of the angle to which the pipe is bent in an obvious manner. After bending the member B is slipped off of the pipe, which is then removed from the clamping-jaws of the member A and the apparatus is ready for further use.

The device is simple and inexpensive in construction, rapid and efficient in operation, prevents crushing or flattening of the pipe during the bending, and may be readily operated by hand, producing a uniform product bent to the angle determined upon.

I do not wish to be understood as limiting myself to the precise details of construction set forth, as it is obvious that the structural features of these details may be varied without departing from the principle of my invention.

I claim—

1. A pipe-bending apparatus comprising two separate members, one adapted to clamp the pipe and the other movable thereon, each of said members having a curved surface to determine the curvature of the pipe, projecting flanges extending over the pipe parallel to the plane in which it is bent and on opposite sides thereof, and an angular face to determine the angle of the bend, and means for varying the relative angular position of said members, substantially as described.

2. A pipe-bending apparatus comprising two separate members, one adapted to clamp the pipe and the other movable thereon, each of said members having a curved surface to determine the curvature of the pipe, projecting flanges extending over the pipe parallel to the plane in which it is bent and on opposite sides thereof, and an angular face to determine the angle of the bend, and a lever connected to one of said members, substantially as described.

3. A pipe-bending apparatus comprising two separate members, the one a fixed member having jaws to clamp the pipe and the other member adapted to slide on the pipe and having a lever connected thereto, each of said members having a curved surface to determine the curvature of the pipe, projecting flanges extending over the pipe parallel to the plane in which it is bent and on opposite sides thereof, and an angular face to determine the angle of the bend, substantially as described.

4. In a pipe-bending apparatus of the character described, the combination, with a fixed member adapted to clamp the pipe, of a second member adapted to slide on the pipe and having an apertured body in two parts detachably connected, and a hollow lever clamped between said two parts and adapted to receive the projecting end of the pipe, substantially as described.

HENRY F. CONDON.

Witnesses:
HENRY W. PRENTICE,
FRANK M. MUNGER.